United States Patent
Yanagihara

(10) Patent No.: US 12,506,846 B2
(45) Date of Patent: Dec. 23, 2025

(54) IMAGE PROCESSING SYSTEM, COMMUNICATION APPARATUS, AND IMAGE PROCESSING METHOD

(71) Applicant: NEC Corporation, Tokyo (JP)

(72) Inventor: Yuichi Yanagihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 18/021,931

(22) PCT Filed: Sep. 30, 2020

(86) PCT No.: PCT/JP2020/037192
§ 371 (c)(1),
(2) Date: Feb. 17, 2023

(87) PCT Pub. No.: WO2022/070322
PCT Pub. Date: Apr. 7, 2022

(65) Prior Publication Data
US 2023/0308612 A1      Sep. 28, 2023

(51) Int. Cl.
*H04N 7/18*      (2006.01)
(52) U.S. Cl.
CPC .................................. *H04N 7/181* (2013.01)
(58) Field of Classification Search
None
See application file for complete search history.

(56) References Cited

U.S. PATENT DOCUMENTS

| | | | |
|---|---|---|---|
| 7,730,814 B2 * | 6/2010 | Takahashi | G06V 20/56 382/106 |
| 10,469,282 B1 * | 11/2019 | Konrardy | G08G 1/146 |
| 11,087,404 B1 * | 8/2021 | Devereaux | G06Q 50/163 |
| 2005/0046584 A1 * | 3/2005 | Breed | G06F 3/0237 340/13.31 |
| 2012/0105635 A1 * | 5/2012 | Erhardt | G07C 5/0866 348/148 |
| 2019/0174099 A1 * | 6/2019 | Hodge | G11B 20/0021 |
| 2019/0177119 A1 * | 6/2019 | Konishi | B66B 1/3476 |
| 2019/0190970 A1 * | 6/2019 | Systrom | G03B 7/08 |
| 2019/0207992 A1 * | 7/2019 | Systrom | H04L 65/65 |

(Continued)

FOREIGN PATENT DOCUMENTS

| | | |
|---|---|---|
| JP | 2007-131382 | 5/2007 |
| JP | 2012-146022 | 8/2012 |

(Continued)

OTHER PUBLICATIONS

International Search Report for PCT Application No. PCT/JP2020/037192, mailed on Dec. 28, 2020.

*Primary Examiner* — Sherrie Hsia
(74) *Attorney, Agent, or Firm* — Sughrue Mion, PLLC

(57) ABSTRACT

The image processing apparatus performs image processing on videos. A communication apparatus communicates with the image processing apparatus. A camera is mounted on a moving body. In the communication apparatus, an operation status determination unit determines that a moving body is in a predetermined operation status. A video transmission unit transmits videos of the camera mounted on the moving body to the image processing apparatus when the moving body is determined by the operation status determination unit to be in the predetermined operation status.

19 Claims, 12 Drawing Sheets

(56) References Cited

U.S. PATENT DOCUMENTS

| | | | | |
|---|---|---|---|---|
| 2020/0296333 A1* | 9/2020 | Itsumi | .............. | H04N 21/23418 |
| 2020/0327315 A1* | 10/2020 | Mullins | ................ | G06V 40/103 |
| 2021/0192224 A1* | 6/2021 | Nakagawa | ............. | G06V 20/40 |
| 2021/0279475 A1* | 9/2021 | Tusch | ................. | H04L 63/0861 |

FOREIGN PATENT DOCUMENTS

| | | |
|---|---|---|
| JP | 2016-062414 | 4/2016 |
| JP | 2017-117194 | 6/2017 |
| JP | 2018-062197 A | 4/2018 |
| JP | 2019-219899 | 12/2019 |
| JP | 2020-064341 | 4/2020 |
| WO | 2017/212568 A | 12/2017 |

* cited by examiner

IMAGE PROCESSING SYSTEM, COMMUNICATION APPARATUS, AND IMAGE PROCESSING METHOD

This application is a National Stage Entry of PCT/JP2020/037192 filed on Sep. 30, 2020, the contents of all of which are incorporated herein by reference, in their entirety.

TECHNICAL FIELD

The present disclosure relates to an image processing system, a communication apparatus, an image processing method, a communication method, and a computer readable media.

BACKGROUND ART

Generally, it is important to keep passengers safe on moving bodies such as buses. In the moving body, a driver visually checks the passengers' statuses to prevent any falling accident occurring inside the vehicle. However, visual confirmation has limitations.

As a related art, Patent Literature 1 discloses a safe traveling system to be installed in a vehicle. In the safe traveling system described in Patent Literature 1, a camera captures videos of the interior of an automobile or a bus. A safety determination unit detects states of occupants of the vehicle based on the images captured by the camera and determines the safety level of the occupants in the case of an impact caused by an accident. The safety determination unit determines the safety as being at Level 1, for example, when all the occupants are seated and not wearing seat belts. The safety determination unit determines the safety as being at Level 2 when there is a person standing among the occupants and the person is grasping a fixture in the vehicle. The safety determination unit determines the safety as Level 3 when there is a person standing among the occupants and the person is not protected against being injured if an impact caused by an accident occurs.

In another related art, Patent Literature 2 discloses a monitoring apparatus that monitors specific areas, such as the interior of elevators or buses. In Patent Literature 2, a monitoring camera captures a specific area. A video transmission apparatus transmits videos from the monitoring camera to an external apparatus. The monitoring apparatus calculates the number of people present in the specific area and the deviation in the positions of people based on the videos from the monitoring camera. The monitoring apparatus adjusts a video recording density and a frequency of communication of the video transmission apparatus based on the calculated number of people and the deviation.

Specifically, in a case where the number of passengers is three or more and passengers are concentrated in a particular position, the monitoring apparatus determines that a dangerous event is likely to occur; in other words, the importance of such a case is high.

In a case where the passengers are not concentrated in a particular position, the monitoring apparatus determines that a dangerous event is less likely to occur; in other words, the importance of such a case is low. If the monitoring apparatus determines that the importance of a case is high, it determines that the image quality and the frequency of transmission are at a "high level". If the monitoring apparatus determines that the importance of a case is low, it determines the image quality and the frequency of transmission are at a "low level".

In another related art, Patent Literature 3 discloses an image processing apparatus for vehicles. The image processing apparatus described in Patent Literature 3 has a plurality of buffers corresponding to a plurality of cameras. The plurality of cameras include, for example, four short-range cameras and two long-distance cameras. In the image processing apparatus, a processor performs image processing on a predetermined number of image data pieces per unit time. At low vehicle speeds, the processor sequentially selects four buffers for the four short-range cameras and processes the images. If the speed is greater than or equal to a threshold, the processor selects only the buffer corresponding to a specific short-range camera that captures an area in front of the vehicle and processes the images.

CITATION LIST

Patent Literature

Patent Literature 1: Japanese Unexamined Patent Application Publication No. 2018-062197
Patent Literature 2: International Patent Publication No. WO 2017/212568
Patent Literature 3: Japanese Unexamined Patent Application Publication No. 2020-64341

SUMMARY OF INVENTION

Technical Problem

In Patent Literature 1, an image processing apparatus that constitutes the safety determination unit is mounted on each vehicle. Generally, image analysis requires a high-performance image processing apparatus, which is expensive. Thus, the problem in Patent Literature 1 is that the cost is high, because an expensive image processing apparatus must be mounted on each vehicle. Also, in Patent Literature 1, a vehicle may have more than one camera. In that case, the cost increases further when a plurality of image processing apparatuses are mounted on a vehicle corresponding to a plurality of cameras.

The monitoring apparatus described in Patent Literature 2 can reduce an amount of data to be transmitted to an external apparatus and reduce communication costs by switching image quality and a frequency of transmission according to the importance. However, when the monitoring apparatus is used in a vehicle such as a taxi or a bus, the video transmission apparatus always transmits video data to an external apparatus while the vehicle is traveling. When a wireless communication network is used for communication between the vehicle and the external apparatus, the communication fee increases as the amount of transmitted data increases, and the cost increases when the video data is constantly transmitted to the external apparatus.

The image processing apparatus described in Patent Literature 3 can process videos from a plurality of cameras on a single processor by switching a plurality of buffers. However, if the videos from the plurality of cameras are constantly analyzed by the processor in the image processing apparatus, the processor is required to have a high processing capacity. While Patent Literature 3 can lower costs compared to the costs required for a plurality of processors to process videos from a plurality of cameras, the effect of such cost saving is limited.

In view of the above, an object of the present disclosure is to provide an image processing system, a communication apparatus, an image processing method, a communication method, and a computer readable medium that can reduce at least some of the above costs.

Solution to Problem

In order to achieve the above object, the present disclosure provides an image processing system as a first example aspect. The image processing system includes: one or more image processing apparatuses configured to perform image processing on videos; and one or more communication apparatuses configured to communicate with the image processing apparatus. The communication apparatus includes: operation status determination means for determining that a moving body is in a predetermined operation status; and video transmission means for transmitting the videos of one or more cameras mounted on the moving body to the image processing apparatus when the moving body is determined to be in the predetermined operation status.

The present disclosure provides a communication apparatus as a second example aspect. The communication apparatus includes: operation status determination means for determining that a moving body is in a predetermined operation status; and video transmission means for transmitting videos of one or more cameras mounted on the moving body to the image processing apparatus for performing image processing on the videos when the moving body is determined to be in the predetermined operation status.

The present disclosure provides an image processing method as a third example aspect. The image processing method includes: determining that a moving body is in a predetermined operation status; transmitting videos of one or more cameras mounted on the moving body to the image processing apparatus when the moving body is determined to be in the predetermined operation status; and performing, by the image processing apparatus, image processing on the videos of the one or more cameras.

The present disclosure provides an image processing method as a fourth example aspect. A communication method includes: determining that a moving body is in a predetermined operation status; and transmitting videos of one or more cameras mounted on the moving body to one or more image processing apparatuses for performing image processing on the videos when the moving body is determined to be in the predetermined operation status.

The present disclosure provides a non-transitory computer readable medium as a fifth example aspect. A non-transitory computer readable medium storing a program for causing a processor to execute processing of: determining that a moving body is in a predetermined operation status; and transmitting videos of one or more cameras mounted on the moving body to one or more image processing apparatuses for performing image processing on the videos when the moving body is determined to be in the predetermined operation status.

Advantageous Effects of Invention

An image processing system, a communication apparatus, an image processing method, a communication method, and a computer readable medium according to the present disclosure can reduce at least some of costs required for image processing.

EXAMPLE EMBODIMENT

Figure 1:
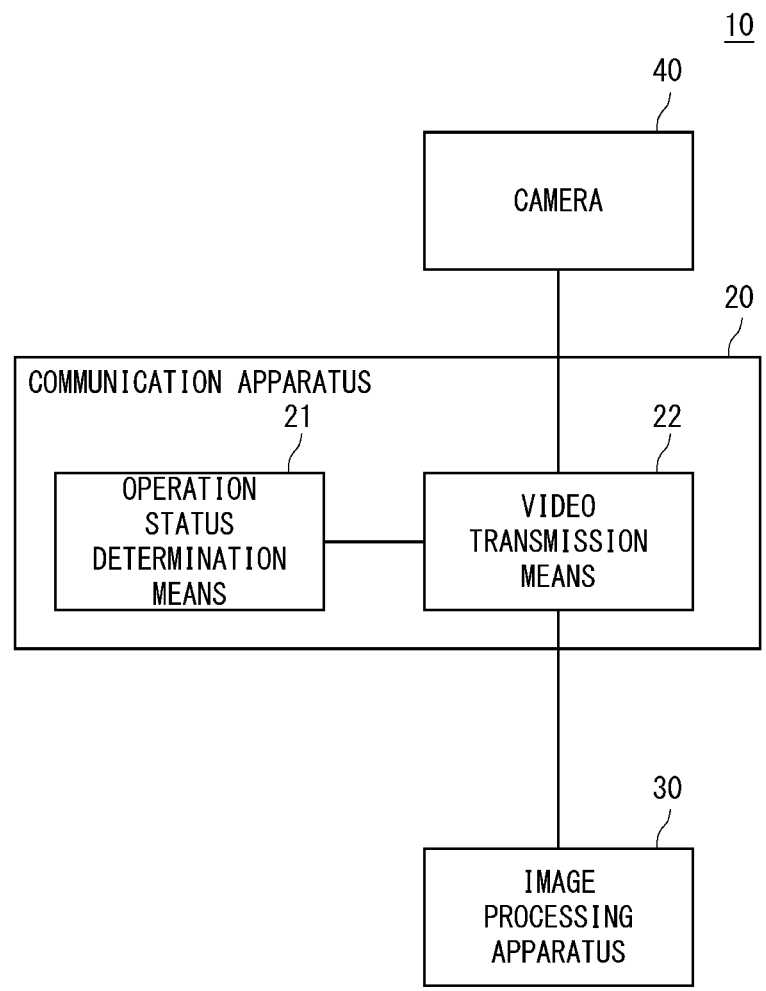
FIG. 1 is a block diagram schematically showing an image processing system according to the present disclosure.

An overview of the present disclosure is provided prior to describing example embodiments of the present disclosure. FIG. 1 schematically shows an image processing system according to the present disclosure. The image processing system 10 includes a communication apparatus 20 and an image processing apparatus 30. The image processing apparatus 30 performs image processing on videos. The communication apparatus 20 communicates with the image processing apparatus 30. Although one communication apparatus 20 and one image processing apparatus 30 are shown in FIG. 1, the image processing system 10 may include a plurality of the communication apparatuses 20 and a plurality of the image processing apparatuses 30.

The communication apparatus 20 includes operation status determination means 21 and video transmission means 22. The operation status determination means 21 determines that a status of a moving body is a predetermined operation status. A camera 40 is mounted on the moving body. A plurality of the cameras 40 may be mounted on the moving body. When it is determined that the status of the moving body is a predetermined operation status, the video transmission means 22 transmits videos of the camera 40 to the image processing apparatus 30. The image processing apparatus 30 performs image processing on the transmitted videos.

In present disclosure, the video transmission means 22 transmits the videos of the camera 40 to the image processing apparatus 30 when it is determined that the status of the moving body is a predetermined operation status. In the present disclosure, the image processing apparatus 30 performs image processing on the videos of the camera 40 transmitted from the moving body in a predetermined operation status. In the present disclosure, the image processing apparatus 30 can be used in certain operation statuses without always using the image processing apparatus 30. In this way, the image processing apparatus 30 can be used efficiently, and the cost involved in using the image processing apparatus 30 can be reduced compared to the case where the videos of the camera 40 are always processed by the image processing apparatus 30.

Figure 2:
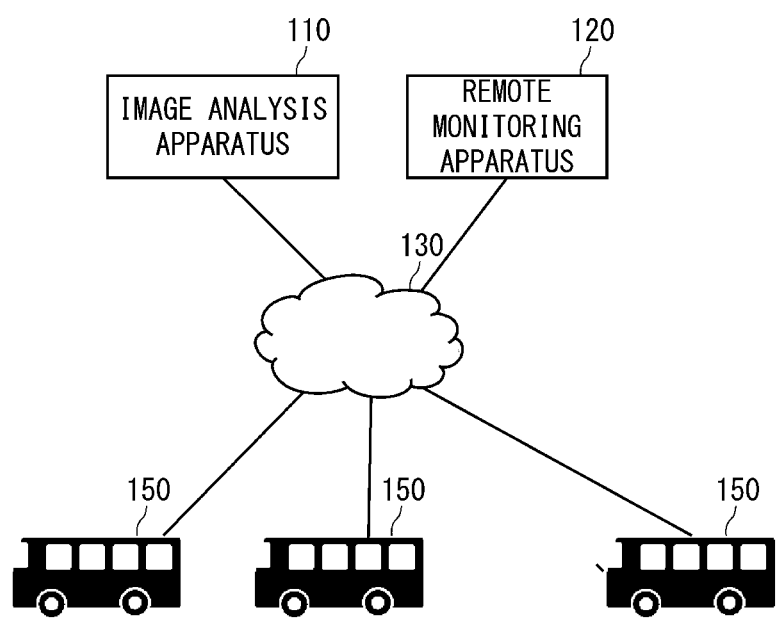
FIG. 2 is a block diagram showing an image analysis system according to a first example embodiment of the present disclosure.

Hereinafter, the example embodiments of the present disclosure will be described in detail. FIG. 2 shows the image analysis system according to the first example embodiment of the present disclosure. An image analysis system 100 includes an image analysis apparatus 110, a remote monitoring apparatus 120, and one or more moving bodies 150, which are to be monitored. The moving bodies 150 are connected to the image analysis apparatus 110 and the remote monitoring apparatus 120 via a network 130. Networks include, for example, networks using communication line standards such as LTE (Long Term Evolution). The network 130 may include a wireless communication network such as WiFi or a 5th generation mobile communication system. The image analysis system 100 corresponds to the image processing system 10 shown in FIG. 1.

Each of the moving bodies 150 is configured as a vehicle traveling with passengers on board such as a bus or a train. The moving body 150 may be configured to enable automatic driving (autonomous driving) based on information from sensors mounted on the moving body. The following description gives an example in which each of the moving body 150 is mainly a bus traveling on a road.

Figure 3:
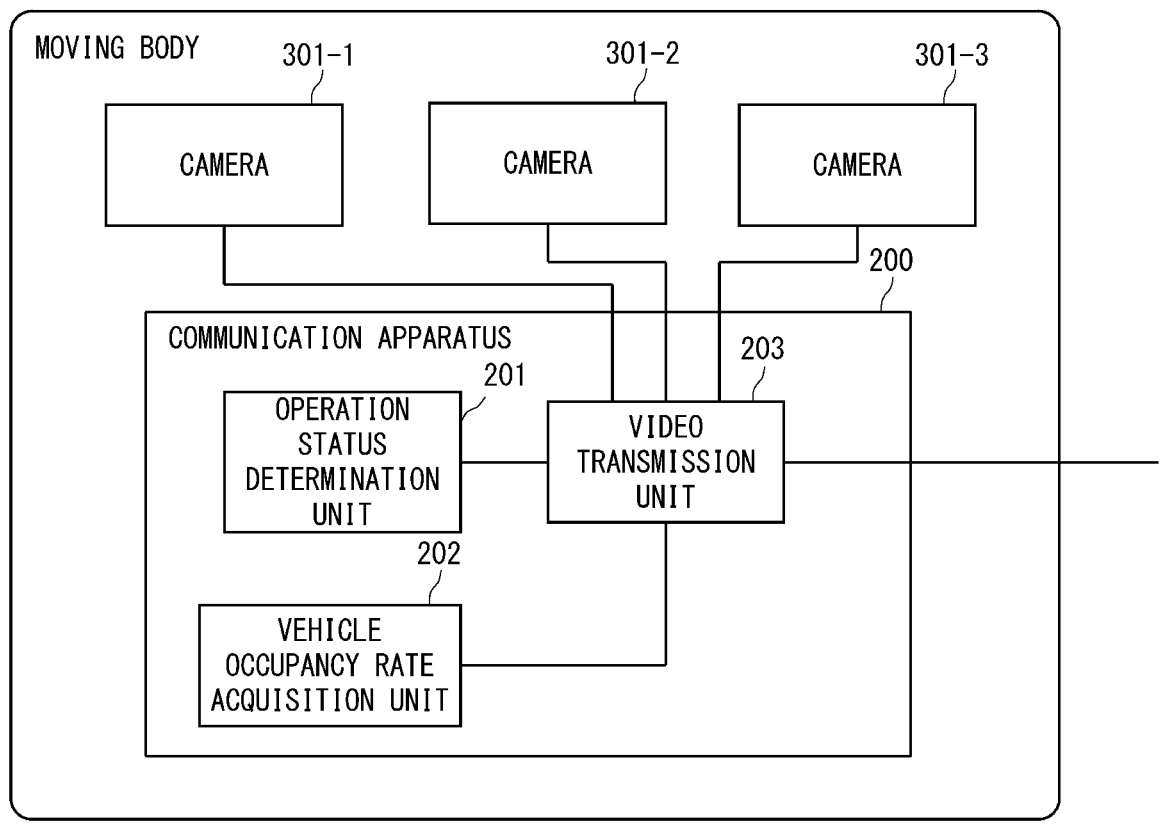
FIG. 3 is a block diagram showing an example of a configuration of a moving body.

FIG. 3 shows a configuration of the moving body 150. The moving body 150 includes a communication apparatus 200 and cameras 301-1 to 301-3. The cameras 301-1 to 301-3 captures the interior of the moving body 150. The cameras 301-1 to 301-3 capture the areas in particular where passengers board. The cameras 301-1 to 301-3 capture, for example, different parts of the vehicle interior. For example, the camera (first camera) 301-1 captures the entire interior of the vehicle. The camera (second camera) 301-2 and the camera 301-2 capture specific parts of the interior of the vehicle. The capturing range of the cameras 301-2 and 301-3 shall be narrower than that of the camera 301-1.

Although FIG. 3 shows an example in which the moving body 150 has three cameras, the number of cameras is not specifically limited to three. In the following description, the cameras 301-1 to 301-3 are also referred to as cameras 301, when it is not particularly necessary to distinguish them. Each of the cameras 301 correspond to the camera 40 shown in FIG. 1.

The communication apparatus 200 is configured as an apparatus that performs wireless communication between the moving bodies 150 and the network 130 (see FIG. 2). The communication apparatus 200 communicates with the image analysis apparatus 110 via the network 130. The communication apparatus 200 may further communicate with the image analysis apparatus 110 via the remote monitoring apparatus 120.

The communication apparatus 200 has an operation status determination unit 201, a vehicle occupancy rate acquisition unit 202, and a video transmission unit 203. Although not shown in FIG. 3, the communication apparatus 200 also includes a radio communication antenna, a transmitter, a receiver, and so on. The functions of the operation status determination unit 201, the vehicle occupancy rate acquisition unit 202, and the video transmission unit 203 are implemented, for example, by a processor executing a control program stored in a memory. The communication apparatus 200 corresponds to the communication apparatus 20 shown in FIG. 1.

The operation status determination unit 201 determines the specific operation status of the moving body 150. The operation status determination unit 201 determines, as the specific operation status, for example, a status in which a danger such as a fall may occur to an unseated passenger. The operation status determination unit 201 determines, for example, a status in which the moving body 150 stops at a stop and a status in which the moving body 150 departs from a stop as the specific operation status. In addition, the operation status determination unit 201 determines a status in which an acceleration of the moving body 150 measured by using an acceleration sensor or the like in longitudinal and lateral directions is greater than or equal to a predetermined value as the specific operation status.

The operation status determination unit 201 may determine the specific operation status by acquiring information indicating the operation status in the moving body 150 from an in-vehicle broadcasting apparatus that provides information such as a guidance on stops. The operation status determination unit 201 may determine, for example, a period between the time when an announcement about an arrival at a stop and a time when a door of a platform is opened, as the status in which the moving body arrives at the stop. Even when the above announcement is made, if the button to get off is not pressed and there is no one to get off at the next stop, the operation status determination unit 201 may determine that the operation status is not a status in which the moving body 150 stops at the stop.

Moreover, after the moving body stops at a stop, the operation status determination unit 201 may determine a status in which the moving body 150 departs from the stop by using information indicating opening and closing of a door and operation information about a brake pedal. The operation status determination unit 201 may determine the period from closing of the platform or when the moving body stops to release of a brake as a status in which the moving body 150 departs from the stop. The method by which the operation status determination unit 201 determines the specific operation status may be any method, and is not limited to the above. The operation status determination unit 201 corresponds to the operation status determination means 21 shown in FIG. 1.

The vehicle occupancy rate acquisition unit (vehicle occupancy rate acquisition means) 202 acquires a vehicle occupancy rate of the moving body 150. The vehicle occupancy rate acquisition unit 202 may acquire the vehicle occupancy rate by using an existing vehicle occupancy detection system that uses, for example, a contactless IC (Integrated Circuit) card or a ticket (numbered ticket) to detect passengers getting on or off.

When the operation status determination unit 201 determines that the operation status of the moving body 150 is the specific operation status, the video transmission unit 203 transmits the videos captured by the cameras 301 to the image analysis apparatus 110 via the network 130 (see FIG. 2). The video transmission unit 203 transmits, to the image analysis apparatus 110, for example, three vehicle interior videos captured by the cameras 301-1 to 301-3. The video transmission unit 203 may always transmit the videos of the cameras 301 to the remote monitoring apparatus 120. The video transmission unit 203 may transmit the videos of the camera 301-1 to the image analysis apparatus 110 and the remote monitoring apparatus 120 when the operation status is the specific operation status. The video transmission unit 203 corresponds to the video transmission means 22 shown in FIG. 1.

The video transmission unit 203 acquires the vehicle occupancy rate from the vehicle occupancy rate acquisition unit 202. When the operation status of the moving body 150 is determined to be the specific operation status and the vehicle occupancy rate is greater than or equal to a first threshold, the video transmission unit 203 transmits the videos of the cameras 301. When the vehicle occupancy rate is lower than the first threshold, the video transmission unit 203 does not transmit the videos of the cameras 301 even if the operation status of the moving body 150 is determined to be the specific operation status.

Furthermore, the video transmission unit 203 may determine the videos of the cameras 301 whose videos are to be transmitted according to the vehicle occupancy rate. If, for example, the vehicle occupancy rate is greater than or equal to a second threshold, which is greater than the first threshold, the video transmission unit 203 may determine all of the videos of the three cameras 301 as the videos to be transmitted. When the vehicle occupancy rate is greater than or equal to the first threshold and lower than the second threshold, the video transmission unit 203 may determine the videos of the camera 301-1, which captures the entire interior of the vehicle, among the three cameras, as the videos to be transmitted.

Note that the moving body 150 may have a peripheral monitoring sensor that monitors a peripheral status of the moving body 150, which is not shown in FIG. 3. The peripheral monitoring sensors include, for example, cameras, radar, and LiDAR (Light Detection and Ranging). The peripheral monitoring sensor may include a plurality of cameras that capture, for example, areas in front, on the rear side, on the right side, and on the left sides of the vehicle. The communication apparatus 200 may transmit sensor information acquired by the peripheral monitoring sensor to the remote monitoring apparatus 120.

The image analysis apparatus 110 performs image processing on the videos received from the moving bodies 150. The image processing includes, for example, processing to analyze an image and detect a passenger with unstable posture inside the bus. In the image processing (image analysis processing), for example, passengers who are not seated and passengers who are not holding on to handrails or the like are detected. The image analysis processing performed in the image analysis apparatus 110 is not particularly limited to the above. The image analysis apparatus 110 is configured as, for example, a cloud server (cloud GPU (Graphics Processing Unit)). For example, a usage fee per unit time such as one hour is set for the image analysis apparatus 110, and the usage fee for the image analysis apparatus 110 is determined according to the period of use. The image analysis apparatus 110 may be a server installed in a remote monitoring center where the remote monitoring apparatus 120 is installed. The image analysis apparatus 110 corresponds to the image processing apparatus 30 shown in FIG. 1.

Figure 4:
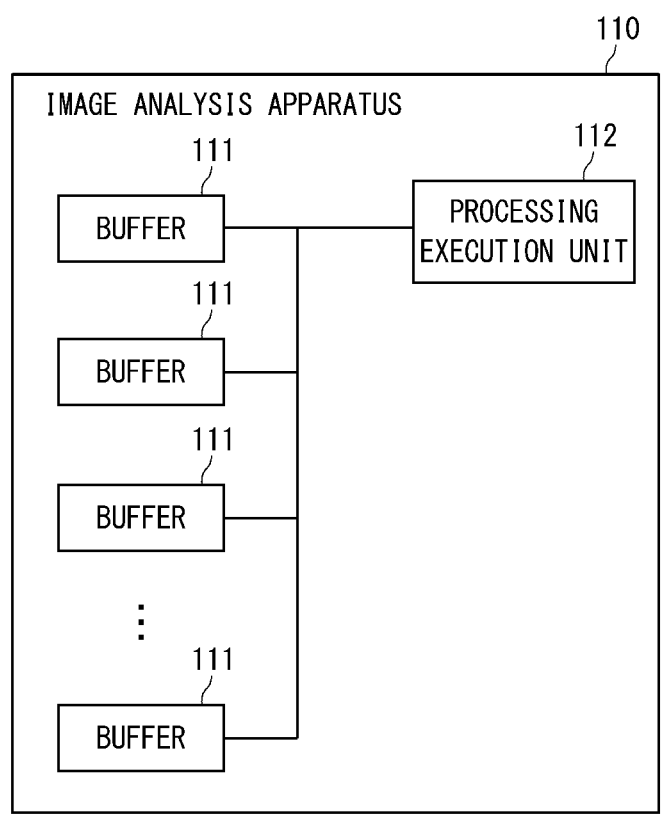
FIG. 4 is a block diagram showing an example of a configuration of an image analysis apparatus.

FIG. 4 shows an example of the configuration of the image analysis apparatus 110. The image analysis apparatus 110 has a plurality of buffers 111 and a processing execution unit 112. The image analysis apparatus 110 receives a plurality of videos from the one or more moving bodies 150. The plurality of buffers 111 are disposed corresponding to the plurality of videos to be received. Each buffer 111 temporarily stores the received, corresponding videos. For example, the image analysis apparatus 110 is configured to enable image analysis on a predetermined number N of videos (N is an integer of two or more) in a predetermined period such as one second. In that case, the image analysis apparatus 110 has N buffers 111.

The processing execution unit 112 performs the image analysis processing on the videos. The processing execution unit 112 includes, for example, a processor. The processing execution unit 112 sequentially performs the image analysis processing on the plurality of videos in a time-division manner. The processing execution unit 112 selects the buffer 111 for storing the videos to be processed, acquires the videos from the selected buffer 111, and performs the image analysis processing on the acquired videos.

The image analysis apparatus 110 transmits a result of the image analysis processing to the remote monitoring apparatus 120. The image analysis apparatus 110 transmits information indicating, for example, a detected position of a passenger with unstable posture to the remote monitoring apparatus 120 as a result of the image analysis processing. The image analysis apparatus 110 may transmit the result of the image analysis processing to the moving body 150. In the moving body 150, the result of the image analysis processing may be notified to the occupant of the moving body 150, such as the driver.

Figure 5:
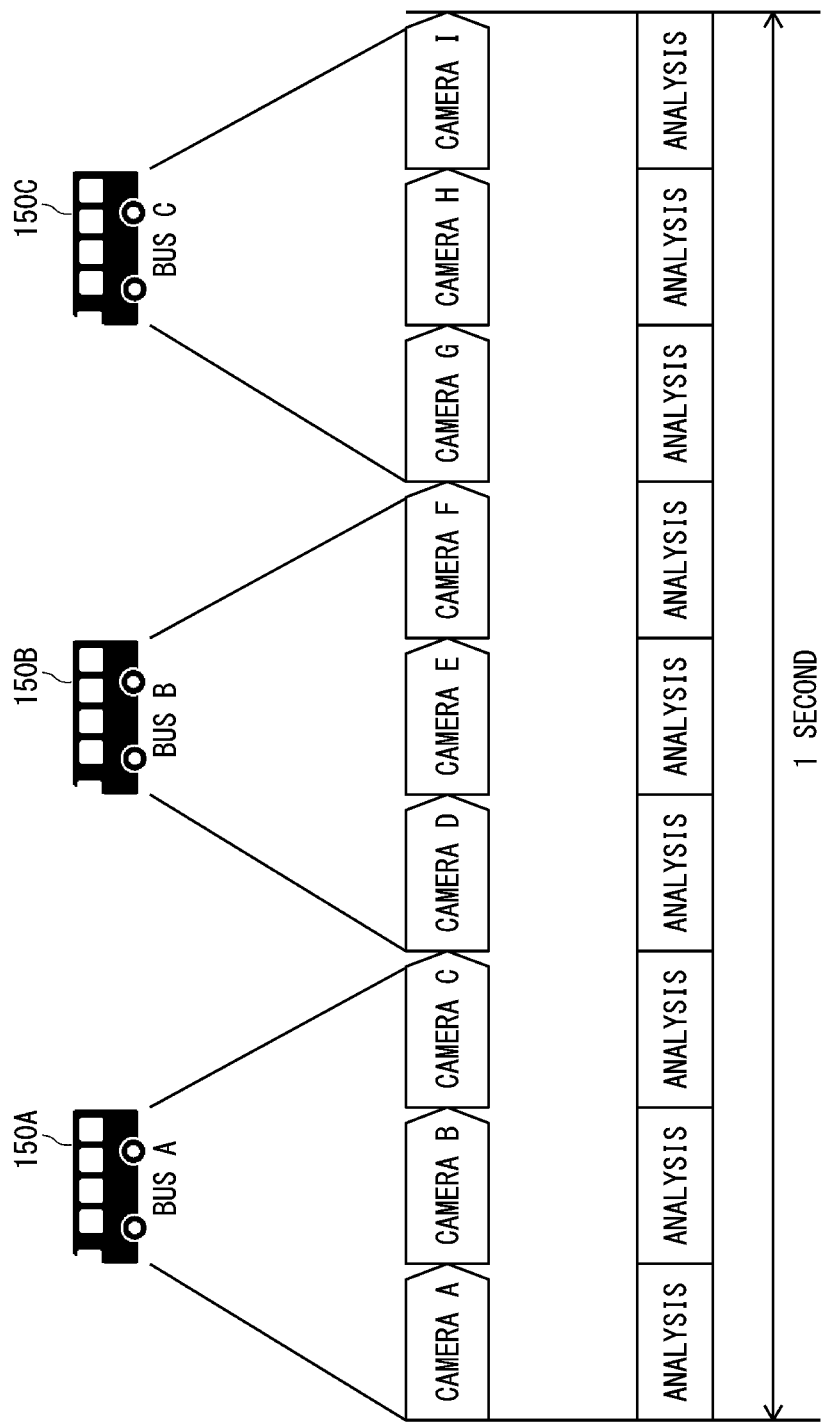
FIG. 5 shows a relationship between a plurality of videos acquired from moving bodies and analysis processing.

FIG. 5 shows a relationship between the plurality of videos acquired from the moving bodies and analysis processing. In FIG. 5, each of a bus (bus A) 150A, a bus (bus B) 150B, and a bus (bus C) 150C has a plurality of cameras. The bus 150A has cameras A to C, the bus 150B has cameras D to F, and the bus 150C has cameras G to I. The buses 150A to 150C correspond to the moving bodies 150 shown in FIG. 2. The cameras A to I correspond to the cameras 301 shown in FIG. 3.

It is assumed that the image analysis apparatus 110 can analyze at most nine videos in a predetermined processing period, for example, one second. In that case, the image analysis apparatus 110 has nine buffers 111 (see FIG. 4). The processing execution unit 112 of the image analysis apparatus 110 divides, for example, one second into nine unit periods and analyzes the videos in each unit period.

In the example of FIG. 5, the image analysis apparatus 110 performs the image analysis processing on each frame image of the cameras A to C received from the bus 150A, and then performs the image analysis processing on each frame image of the cameras D to F received from the bus 150B. Furthermore, the image analysis apparatus 110 performs the image analysis processing on each frame image of the cameras G to I received from the bus 150C. The image analysis apparatus 110 repeatedly performs such time-division sequential processing. In this way, the plurality of videos can be analyzed by using one image analysis apparatus 110.

Returning to FIG. 2, the remote monitoring apparatus 120 is used to monitor the moving bodies 150. The remote monitoring apparatus 120 is disposed in a monitoring center that remotely monitors, for example, the moving bodies 150. In this example embodiment, each of the moving bodies 150 is configured as a vehicle that travels autonomously or is driven by a driver. A monitoring person uses the remote monitoring apparatus 120 to monitor the operations of the moving bodies 150. The remote monitoring apparatus 120 may be configured to remotely control the moving bodies 150.

Figure 6:
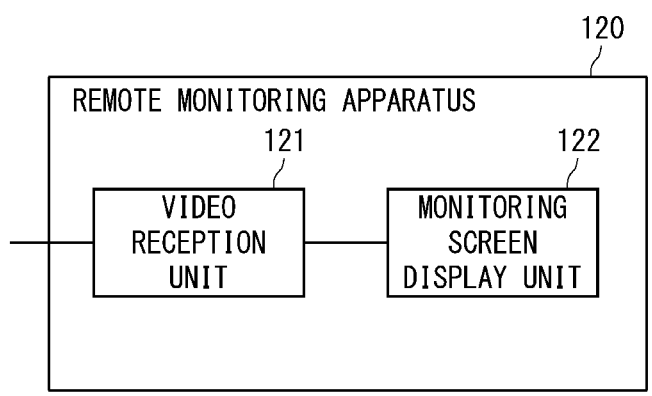
FIG. 6 is a block diagram showing an example of a configuration of a remote monitoring apparatus.

FIG. 6 shows an example of the configuration of the remote monitoring apparatus 120. The remote monitoring apparatus 120 has a video reception unit 121 and a monitor screen display unit 122. The video reception unit 121 receives the videos transmitted from the moving bodies 150 via the network. The video reception unit 121, receives from the moving body 150, videos of the vehicle interior captured by using the cameras 301 (see FIG. 3). The video reception unit 121 may receive the videos of the vehicle interior via the image analysis apparatus 110. The video reception unit 121 may further receive, from the moving bodies 150, the videos obtained by capturing the outside of the moving bodies.

The monitor screen display unit 122 displays the videos received by the video reception unit 121 on a display screen. When the result of the image analysis processing is received from the image analysis apparatus 110, the monitor screen display unit 122 displays the result of the image analysis processing on the display screen. The monitoring person can monitor the status of the vehicle interior of the moving body 150 by looking at the display screen.

The remote monitoring apparatus 120 may receive information from the moving bodies 150, such as vehicle speeds of the moving bodies, the operation states of direction indicators, the opening and closing statuses of the doors, a lighting state of a traffic light, position information, and the distances to other vehicles. The monitor screen display unit 122 may display at least a part of various information received from the moving bodies 150 on the display screen in addition to the videos received by the video reception unit 121.

Figure 7:
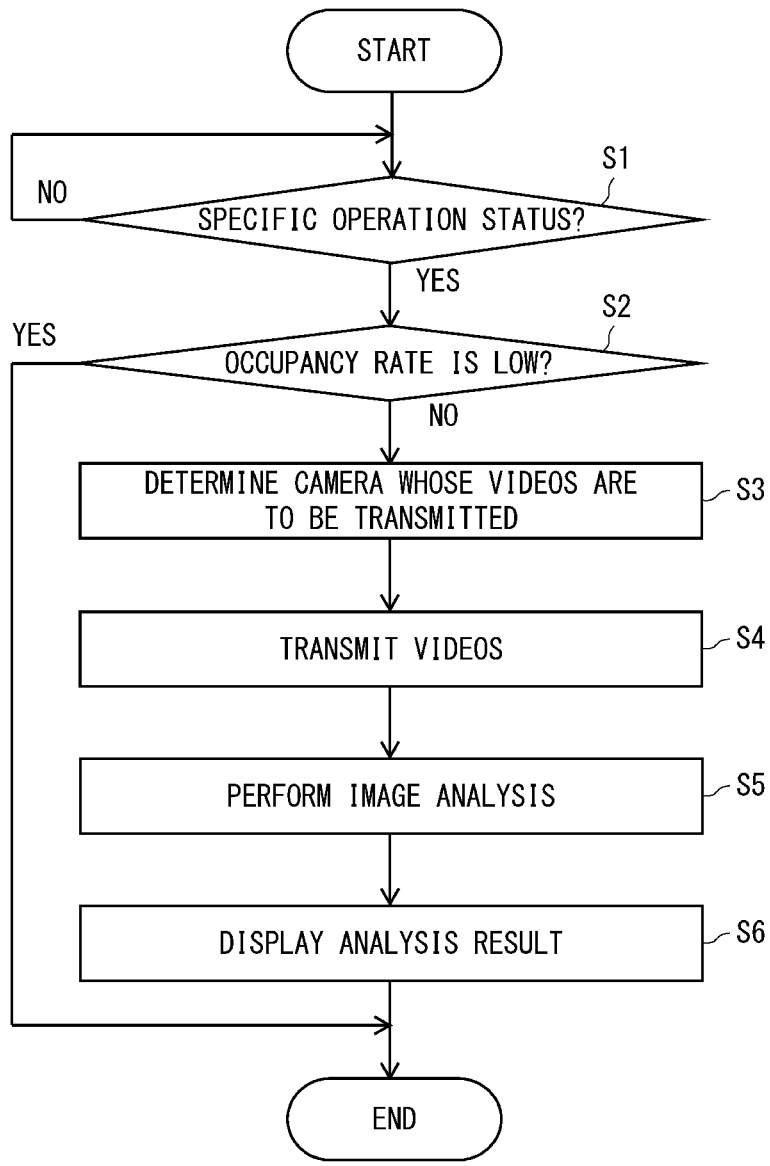
FIG. 7 is flowchart showing an operation procedure of the image analysis system.

Next, an operation procedure will be described. FIG. 7 shows the operation procedure (image processing method) of the image analysis system 100. In the communication apparatus 200 (see FIG. 3) mounted on the moving body 150, the operation status determination unit 201 determines whether the operation status of the moving body 150 is the specific operation status (Step S1). When the operation status determination unit 201 determines that the operation status is the specific operation status, it notifies the video transmission unit 203 to that effect.

The vehicle occupancy rate acquisition unit 202 acquires a vehicle occupancy rate of the moving body 150. When the operation status is determined to be the specific operation status, the video transmission unit 203 judges whether the vehicle occupancy rate acquired by the vehicle occupancy rate acquisition unit 202 is lower than the first threshold (Step S2). When the video transmission unit 203 judges that the vehicle occupancy rate is not lower than the first threshold, it determines the camera whose videos are to be transmitted among the cameras 301 of the moving body 150 (Step S3). In Step S3, the video transmission unit 203 determines the camera whose videos are to be analyzed based on, for example, the vehicle occupancy rate. The video transmission unit 203 transmits the videos of the camera whose videos are to be transmitted to the image analysis apparatus 110 (Step S4). Steps S1 to S4 correspond to the communication method performed in the communication apparatus 200.

The image analysis apparatus 110 receives the videos of the camera to be analyzed from the moving body 150 whose operation status is determined to be the specific operation status among the plurality of moving bodies 150. The image analysis apparatus 110 performs the image analysis processing on the received videos (Step S5). In Step S5, the image analysis apparatus 110 sequentially performs the image analysis processing in a time-division manner on the plurality of videos received from, for example, the plurality of moving bodies 150. The image analysis apparatus 110 performs the image analysis processing to detect, for example, a passenger with unstable posture inside the moving body 150. The image analysis apparatus 110 transmits the result of the image analysis to the remote monitoring apparatus 120.

When the remote monitoring apparatus 120 receives the result of the image analysis processing from the image analysis apparatus 110, it displays the result of the image analysis processing on the display screen (Step S6). In Step S6, the image analysis apparatus 110 highlights and displays an area where the passenger with unstable posture is present, for example, by surrounding the area where the passenger with unstable posture is present with a red frame in the videos of the vehicle interior of the moving body 150. The monitoring person monitors the status of the vehicle interior of the moving body 150 by looking at the display screen.

In this example embodiment, the video transmission unit 203 of the communication apparatus 200 transmits the videos of the camera 301 to the image analysis apparatus 110 when the operation status of the moving body 150 is determined by the operation status determination unit 201 to be the specific operation status. In this way, the image analysis processing can be performed in the image analysis apparatus 110 on the moving body 150 which has been determined to be in the specific operation status. In addition, this example embodiment can shorten a period of use of the image analysis apparatus 110 compared with the case where the videos are always transmitted from the moving body 150 and the image analysis processing is always performed in the image analysis apparatus 110. In this example embodiment, the image analysis system 100 can reduce the usage fee of the image analysis apparatus 110, for example, when the usage fee of the image analysis apparatus 110 changes according to the period of use.

In this example embodiment, as described above, the video transmission unit 203 transmits the videos of the camera 301 to the image analysis apparatus 110 when it is determined that the operation status of the moving body 150 is the specific operation status. In this manner, an amount of communication of the video data transmitted from the moving body 150 to the image analysis apparatus 110 via the network 130 can be reduced. In the network 130, when a communication fee is determined according to the amount of data, there is an effect that the communication fee can be reduced compared with the case where videos are always transmitted.

Furthermore, in this example embodiment, the video transmission unit 203 does not transmit the videos of the cameras 301 when the vehicle occupancy rate is low. By doing so, the video transmission and the image analysis processing can be omitted when, for example, few passengers are on board. When the image analysis processing is omitted, the videos of the cameras 301 may be displayed on the remote monitoring apparatus 120, and the monitoring person may visually monitor the interior of the vehicle.

In this example embodiment, the video transmission unit 203 determines the videos of the camera whose videos are to be transmitted among the videos of the plurality of cameras 301 according to the vehicle occupancy rate. For example, when the vehicle occupancy rate is high and the vehicle is crowded, the video transmission unit 203 analyzes the videos of the three cameras 301 with the image analysis apparatus 110. By doing so, when the vehicle is crowded, safety of passengers can be analyzed in detail by using many videos. On the other hand, when the vehicle occupancy rate is not so high, the amount of communication in the network 130 can be reduced by omitting the image analysis processing of some videos.

Figure 8:
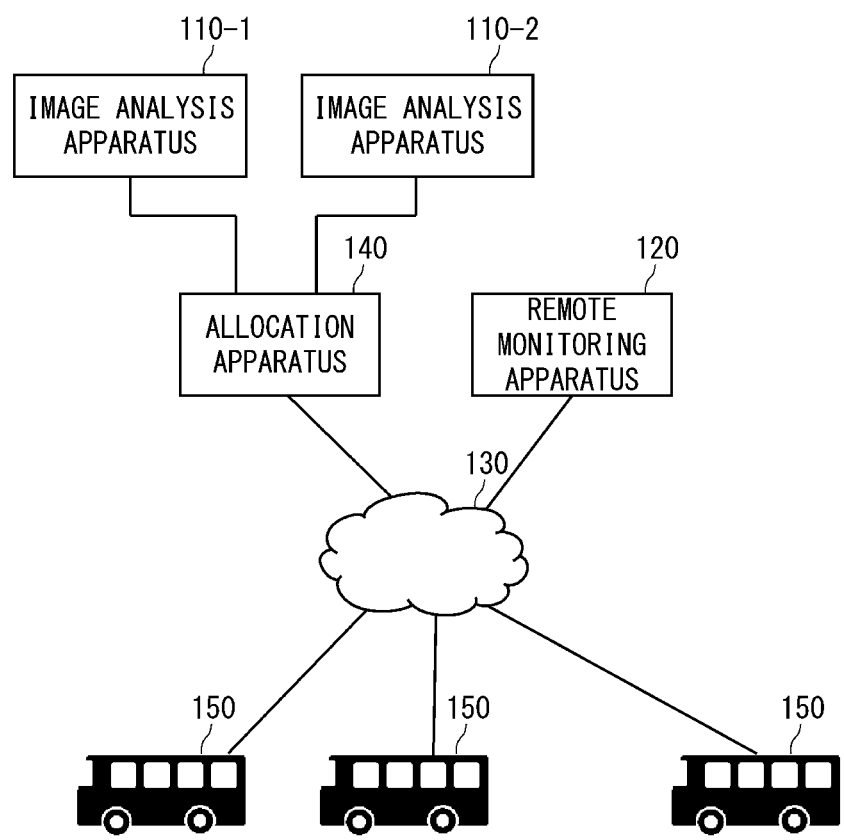
FIG. 8 is a block diagram showing an image analysis system according to a second example embodiment of the present disclosure.

Next, a second example embodiment of the present disclosure will be described. FIG. 8 shows an image analysis system according to the second example embodiment of the present disclosure. An image analysis system 100*a* according to this example embodiment differs from the image analysis system 100 according to the first example embodiment shown in FIG. 2 in that it also has an allocation apparatus 140. The allocation apparatus 140 may be installed in the remote monitoring center where the remote monitoring apparatus 120 is installed. The allocation apparatus 140 may be a part of the remote monitoring apparatus 120.

Further, in this example embodiment, the image analysis system 100*a* includes an image analysis apparatus (first image analysis apparatus) 110-1 and an image analysis apparatus (second image analysis apparatus) 110-2. The number of image analysis apparatuses 110 is not limited to two, and the image analysis system 100*a* may include three or more image analysis apparatuses 110. Other configurations may be the same as those described in the first example embodiment.

In this example embodiment, the allocation apparatus 140 allocates the videos transmitted from the moving bodies 150 to the image analysis apparatus 110-1 or 110-2. The allocation apparatus 140 monitors a processing capacity of each of the image analysis apparatuses 110. When the allocation apparatus 140 receives videos from the moving body 150 whose operation status has been newly determined to be the specific operation status, it judges whether the videos can be processed by the image analysis apparatus 110-1. When the allocation apparatus 140 judges that the received videos can be processed by the image analysis apparatus 110-1, it allocates the received videos to the image analysis apparatus 110-1. When the allocation apparatus 140 judges that the image analysis apparatus 110-1 cannot process the received video, it allocates the received videos to the image analysis apparatus 110-2. The allocation apparatus 140 transmits the received videos to one of the image analysis apparatuses 110 which has been allocated with the videos.

For example, when none of the moving bodies 150 is transmitting video, the image analysis apparatuses 110-1 and 110-2 are dormant. When the allocation apparatus 140 receives the videos from the moving body (first moving body) 150, it operates the image analysis apparatus 110-1 and transmits the videos to the image analysis apparatus 110-1. When the allocation apparatus 140 further receives videos from another moving body (second moving body) 150, it judges a spare capacity of the processing capacity of the image analysis apparatus 110-1. For example, the image analysis apparatus 110-1 is configured to enable image analysis for a predetermined number N of videos. When the image analysis apparatus 110-1 analyzes the videos received from the second moving body 150, the allocation apparatus 140 judges whether the number of videos to be analyzed by the image analysis apparatus 110-1 exceeds N. When the number of videos to be analyzed by the image analysis apparatus 110-1 does not exceed N, the allocation apparatus 140 determines that the image analysis apparatus 110-1 has a spare capacity. When the allocation apparatus 140 determines that the image analysis apparatus 110-1 has a spare capacity, it allocates the videos received from the second moving body 150 to the image analysis apparatus 110-1. That is, the allocation apparatus 140 transmits the videos received from the second moving body 150 to the image analysis apparatus 110-1.

When the allocation apparatus 140 receives the videos from yet another moving body (third moving body) 150, it judges a spare capacity of the image analysis apparatus 110-1. When the image analysis apparatus 110-1 analyzes the videos received from the third moving body 150, the allocation apparatus 140 determines whether the number of videos to be analyzed by the image analysis apparatus 110-1 exceeds N. When the number of videos to be analyzed by the image analysis apparatus 110-1 exceeds N, the allocation apparatus 140 determines that the image analysis apparatus 110-1 has no spare capacity. When the allocation apparatus 140 judges that the image analysis apparatus 110-1 has no spare capacity, it operates the image analysis apparatus 110-2 and allocates the videos received from the third moving body 150 to the image analysis apparatus 110-2. In this case, the allocation apparatus 140 transmits the videos received from the third moving body 150 to the image analysis apparatus 110-2.

For example, at some point in time, the allocation apparatus 140 allocates the videos received from the buses 150A to 150C to the image analysis apparatus 110-1 as shown in FIG. 5. It is assumed that the image analysis apparatus 110-1 can analyze nine videos per unit time (e.g., one second). That is, the upper limit of the videos that can be analyzed by the image analysis apparatus 110-1 is nine. In the example of FIG. 5, the image analysis apparatus 110-1 performs analysis processing on the nine videos per second, and the image analysis apparatus 110-1 is in a state where it is unable to process further videos. When new videos are received from another moving body 150, the allocation apparatus 140 judges that there is no spare capacity in the image analysis apparatus 110-1, operates the image analysis apparatus 110-2, and then transmits the videos received from the other moving body 150 to the image analysis apparatus 110-2.

Figure 9:
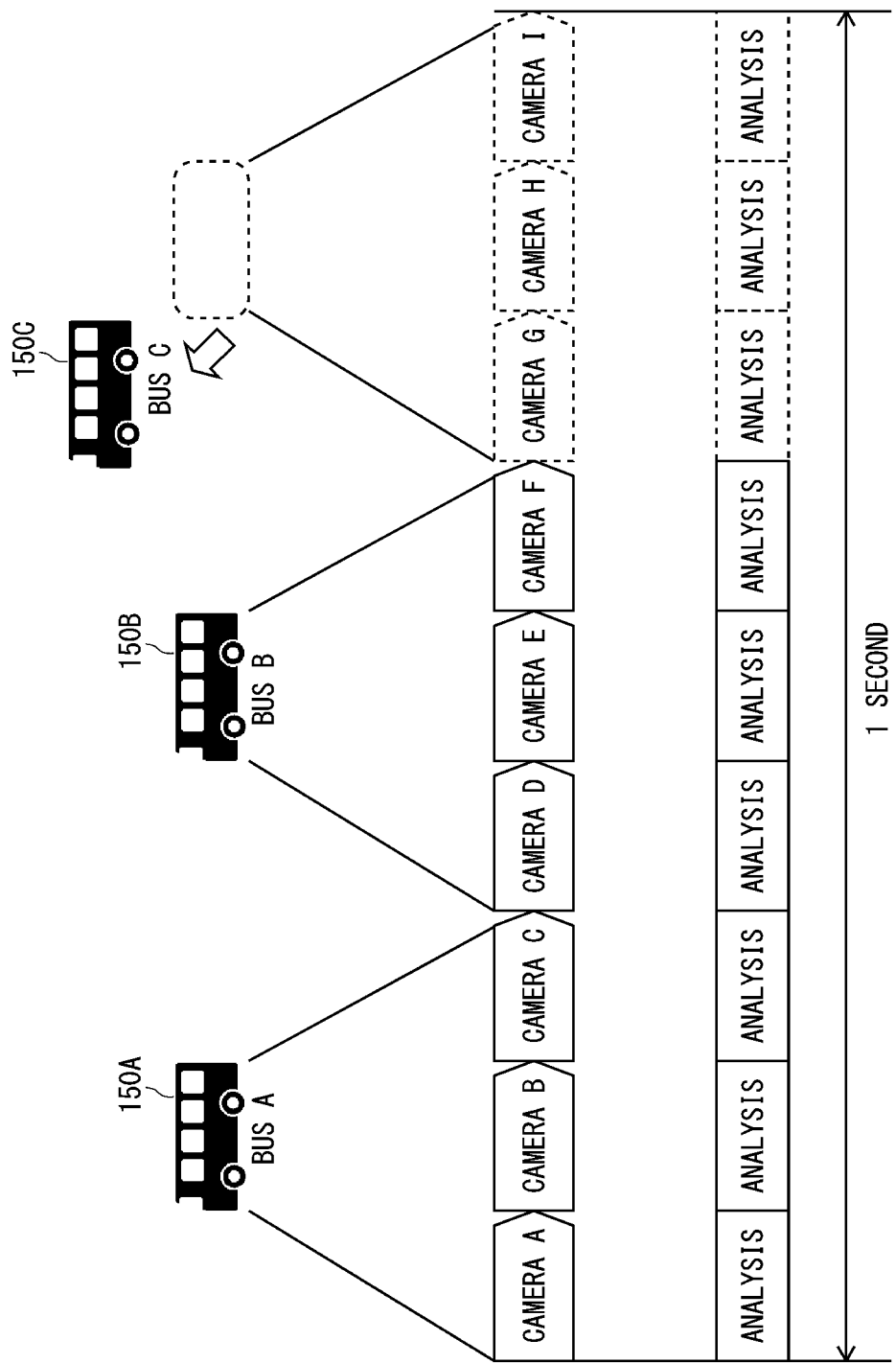
FIG. 9 shows a relationship between a plurality of videos acquired from a moving body and analysis processing.

FIG. 9 shows a relationship between a plurality of videos acquired from moving bodies at different times and the analysis processing. In the example of FIG. 9, the bus 150C departs from, for example, a bus stop and stops transmitting the videos of the cameras G to I. In that case, the number of videos analyzed by the image analysis apparatus 110-1 is reduced from nine to six. After the bus 150C stops transmitting the videos, the image analysis apparatus 110-1 has a spare capacity for three videos.

Figure 10:
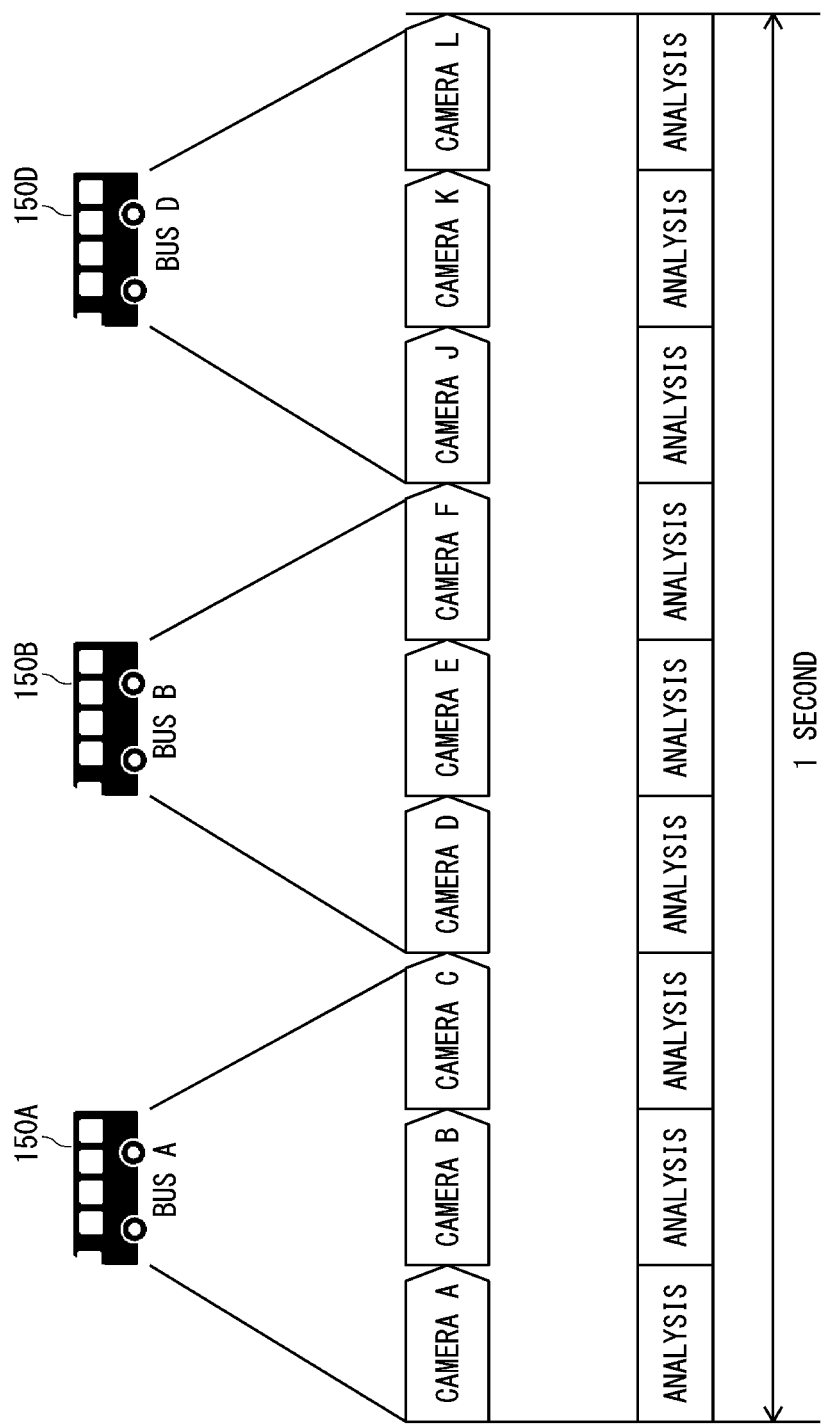
FIG. 10 shows a relationship between plurality of videos acquired from moving bodies and analysis processing.

FIG. 10 shows a relationship between a plurality of videos acquired from the moving bodies at yet another time point and the analysis processing. It is assumed that the allocation apparatus 140 receives the videos of the cameras J to L from another bus (bus D) 150D after the bus 150C stops transmitting the videos. In this case, the allocation apparatus 140 allocates the videos received from the bus 150D to the image analysis apparatus 110-1, because the image analysis apparatus 110-1 can analyze the videos received from the bus 150D. In this case, it is not necessary to operate the image analysis apparatus 110-2.

In this example embodiment, when videos are received from the moving body 150, the allocation apparatus 140 determines whether it is possible to analyze the received videos in the image analysis apparatus 110 in operation. When the allocation apparatus 140 determines that the videos received by the image analysis apparatus 110 in operation can be analyzed, it allocates the received videos to the image analysis apparatus 110 in operation. For example, a case where the correspondence between the moving body 150 and the image analysis apparatus 110 is fixed shall be considered. In this case, one image analysis apparatus 110 may perform the image analysis processing on the videos received from one moving body 150, and another image analysis apparatus 110 may perform the image analysis processing on the videos received from another moving body 150. In this case, it is necessary to use two image analysis apparatuses 110. In this example embodiment, the relationship between the moving bodies 150 and the image analysis apparatus 110 is not fixed, and the image analysis apparatus 110 with a spare capacity is used for the image analysis processing of the videos received from the moving bodies 150. In this way, the image analysis apparatuses 110 can be used efficiently. Moreover, by reducing the number of image analysis apparatuses 110 used, the usage fee for using the image analysis apparatuses 110 can be reduced.

In the above example embodiments, an example in which the image analysis apparatus 110 performs the image analysis processing on the videos of the cameras 301 for capturing the interior of the moving body 150, but present disclosure is not limited to this. The image analysis apparatus 110 only needs to perform the image analysis processing on the videos transmitted from the moving body 150, and the videos to be subjected to the image analysis processing do not necessarily need to be the videos inside the vehicle.

Figure 11:
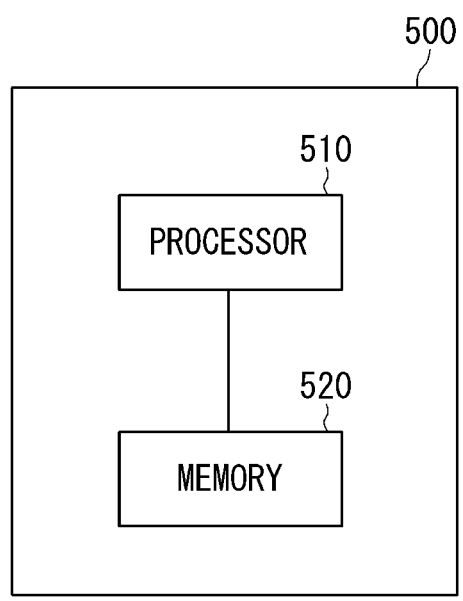
FIG. 11 is a block diagram showing an example of a configuration of a microcomputer.

In the above example embodiment, the functions of the communication apparatus 200 can be implemented using a microcomputer. FIG. 11 shows an example of a configuration of a microcomputer that can be used in the communication apparatus 200. A microcomputer 500 has a processor 510 and a memory 520. In the microcomputer 500, the processor 510 and the memory 520 are connected to each other via a bus. The microcomputer 500 may include other circuits, such as peripheral circuits and interface circuits (not shown).

The memory 520 includes a non-volatile storage apparatus and/or a volatile storage apparatus. The memory 520 stores programs to be executed by the processor 510. The processor 510 reads a program stored in the memory 520 and executes the read program. The function of each unit in the communication apparatus 200 can be implemented when the processor 510 executes the program.

Figure 12:
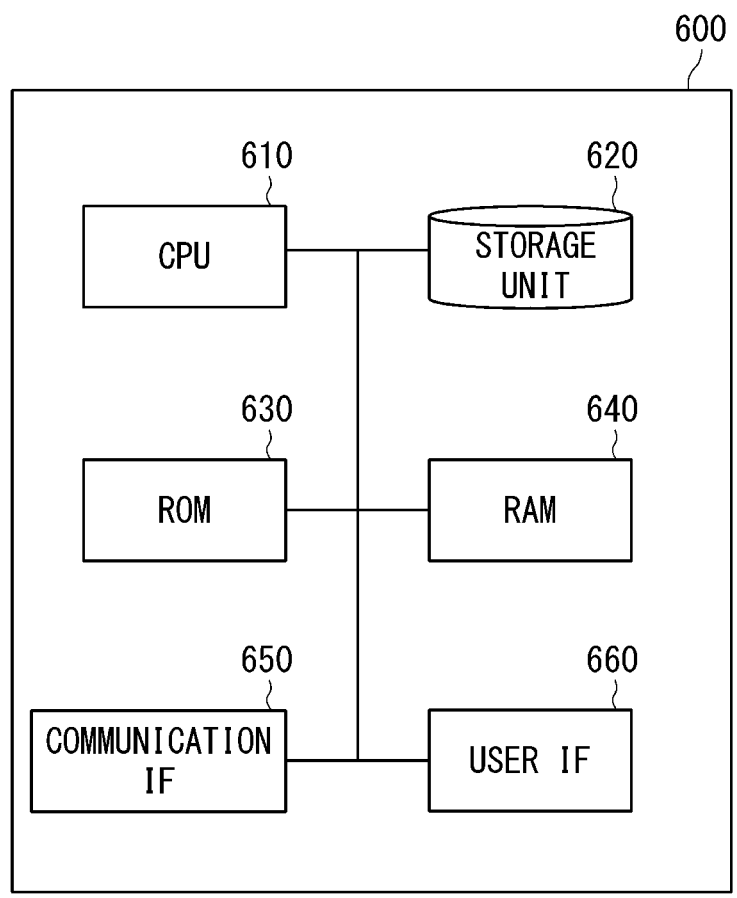
FIG. 12 is a block diagram showing an example of a configuration of a computer apparatus.

Also, in the present disclosure, the image analysis apparatus 110, the remote monitoring apparatus 120, and the allocation apparatus 140 can be configured as a computer apparatus (server apparatus). FIG. 12 shows an example of a configuration of the computer apparatus that can be used as the image analysis apparatus 110 or the like. A computer apparatus 600 has a control unit (CPU: Central Processing Unit) 610, a storage unit 620, a ROM (Read Only Memory) 630, a RAM (Random Access Memory) 640, a communication interface (IF: Interface) 650, and a user interface 660.

The communication interface 650 is for connecting the computer apparatus 600 and the communication network via wired communication means or wireless communication means. The user interface 660 includes a display unit such as a display. The user interface 660 also includes an input unit such as a keyboard, mouse, and touch panel.

The storage unit 620 is an auxiliary storage apparatus capable of holding various types of data. The storage unit 620 need not necessarily be a part of the computer apparatus 600, and instead may be an external storage apparatus or a cloud storage apparatus connected to the computer apparatus 600 via a network.

The ROM 630 is a non-volatile storage apparatus. The ROM 630 is a semiconductor memory apparatus such as a flash memory having a relatively small capacity. Programs executed by the CPU 610 may be stored in the storage unit 620 or the ROM 630. The storage unit 620 or the ROM 630 stores, for example, various programs for implementing the functions of the respective units in, for example, the image analysis apparatus 110, the remote monitoring apparatus 120, or the allocation apparatus 140.

The RAM 640 is a volatile storage apparatus. Various semiconductor memory apparatuses such as a DRAM (Dynamic Random Access Memory) or an SRAM (Static Random Access Memory) are used as the RAM 640. The RAM 640 may be used as an internal buffer for temporarily storing data and the like. The CPU 610 expands the programs stored in the storage unit 620 or the ROM 630 into the RAM 640 and executes it. The functions of each unit in the image analysis apparatus 110, the remote monitoring apparatus 120, or the allocation apparatus 140 can be implemented by the CPU 610 executing the program. The CPU 610 may have an internal buffer that can temporarily store data or the like.

The above programs can be stored and provided to the microcomputer 500 and the computer apparatus 600 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), optical disk medium such as CD (compact disc) and DVD (digital versatile disk), and semiconductor memories (such as mask ROM, PROM (programmable ROM), EPROM (erasable PROM), flash ROM, RAM, etc.). The programs may be provided to the computer using any type of transitory computer readable media. Examples of transitory computer readable media include electric signals, optical signals, and electromagnetic waves. Transitory computer readable media can provide the programs to the computer via a wired communication line (e.g. electric wires, and optical fibers) or a wireless communication line.

Although the example embodiments of the present disclosure have been described above in detail, the present disclosure is not limited to the above-described example embodiments, and changes or modifications to the above-described example embodiments are also included in the present disclosure to the extent that they do not depart from the spirit of the present disclosure.

The whole or part of the example embodiments disclosed above can be described as, but not limited to, the following supplementary notes.

[Supplementary Note 1]

An image processing system comprising:
  one or more image processing apparatuses configured to perform image processing on videos; and
  one or more communication apparatuses configured to communicate with the image processing apparatus, wherein
  the communication apparatus comprises:
    operation status determination means for determining that a moving body is in a predetermined operation status; and
    video transmission means for transmitting the videos of one or more cameras mounted on the moving body to the image processing apparatus when the moving body is determined to be in the predetermined operation status.

[Supplementary Note 2]

The image processing system according to Supplementary note 1, wherein
  the communication apparatus further includes vehicle occupancy rate acquisition means for acquiring a vehicle occupancy rate of the moving body, and
  the video transmission means transmits the videos of the one or more cameras to the image processing apparatus when it is determined that the moving body is in the predetermined operation status and the vehicle occupancy rate is greater than or equal to a first threshold.

[Supplementary Note 3]

The image processing system according to Supplementary note 2, wherein
  a plurality of the cameras are mounted on the moving body, and the video transmission means determines the videos to be transmitted to the image processing apparatus from among the videos captured by the plurality of cameras according to the vehicle occupancy rate.

[Supplementary Note 4]

The image processing system according to Supplementary note 3, wherein the plurality of cameras include a first camera for capturing a vehicle interior of the moving body and a second camera for capturing the vehicle interior of the moving body within a range smaller than that of the first camera, and the video transmission means determines the videos of the first camera and the second camera as the videos to be transmitted to the image processing apparatus when the vehicle occupancy rate is greater than or equal to a second threshold, the second threshold being greater than the first threshold, and determines the videos of the first camera as the videos to be transmitted to the image processing apparatus when the vehicle occupancy rate is greater than or equal to the first threshold and lower than the second threshold.

[Supplementary Note 5]

The image processing system according to any one of Supplementary notes 1 to 4, wherein the image processing apparatus sequentially analyzes the plurality of videos captured by the plurality of cameras in a time-division manner.

[Supplementary Note 6]

The image processing system according to any one of Supplementary notes 1 to 5, further comprising:

a plurality of the communication apparatuses, wherein each one of the plurality of communication apparatuses is mounted on a corresponding one of the plurality of moving bodies.

[Supplementary Note 7]

The image processing system according to Supplementary note 6, further comprising:

an allocation apparatus configured to allocate the videos transmitted from the plurality of communication apparatuses to any of the one or more image processing apparatuses.

[Supplementary Note 8]

The image processing system according to Supplementary note 7, wherein the one or more image processing apparatuses include a first image processing apparatus and a second image processing apparatus, and the first image processing apparatus is capable of performing image processing on a predetermined number of videos per unit time, and the allocation apparatus receives the videos of the one or more cameras from the communication apparatus, determines whether the number of videos to be processed by the first image processing apparatus per unit time exceeds the predetermined number when the received videos of the one or more cameras are processed by the first image processing apparatus, and allocates the received videos of the one or more cameras to the first image processing apparatus when the allocation apparatus determines that the number of videos to be processed does not exceed the predetermined number.

[Supplementary Note 9]

The image processing system according to Supplementary note 8, wherein the allocation apparatus allocates the received videos of the one or more cameras to the second image processing apparatus when the allocation apparatus determines that the number of videos to be processed exceeds the predetermined number.

[Supplementary Note 10]

The image processing system according to any one of Supplementary notes 1 to 9, wherein the operation status determination means determines, as a specific operation status, a status in which a danger may occur to a passenger riding on the moving body.

[Supplementary Note 11]

The image processing system according to any one of Supplementary notes 1 to 10, wherein a status in which a danger may occur to the passenger includes at least one of the following: the moving body stops at a stop, the moving body departs from a stop, and an acceleration of the moving body in longitudinal and lateral directions is greater than or equal to a predetermined value.

[Supplementary Note 12]

A communication apparatus comprising:

operation status determination means for determining that a moving body is in a predetermined operation status; and video transmission means for transmitting videos of one or more cameras mounted on the moving body to an image processing apparatus configured to perform image processing on the videos when the moving body is determined to be in the predetermined operation status.

[Supplementary Note 13]

The communication apparatus according to Supplementary note 12, further comprising:

vehicle occupancy rate acquisition means for acquiring a vehicle occupancy rate of the moving body, and the video transmission means transmits the videos of the camera to the image processing apparatus when it is determined that the moving body is in the predetermined operation status and the vehicle occupancy rate is greater than or equal to a first threshold.

[Supplementary Note 14]

The communication apparatus according to Supplementary note 13, wherein a plurality of the cameras are mounted on the moving body, and the video transmission means determines the videos to be transmitted to the image processing apparatus from among the videos captured by the plurality of cameras according to the vehicle occupancy rate.

[Supplementary Note 15]

The communication apparatus according to any one of Supplementary notes 12 to 14, wherein the communication apparatus is mounted on the moving body.

[Supplementary Note 16]

The communication apparatus according to any one of Supplementary notes 12 to 15, wherein the operation status determination means determines, as a specific operation status, a status in which a danger may occur to a passenger riding on the moving body.

[Supplementary Note 17]

An image processing method comprising:

determining that a moving body is in a predetermined operation status;

transmitting videos of one or more cameras mounted on the moving body to an image processing apparatus when the moving body is determined to be in the predetermined operation status; and performing, by the image processing apparatus, image processing on the videos of the one or more cameras.

[Supplementary Note 18]

A communication method comprising:
determining that a moving body is in a predetermined operation status; and
transmitting videos of one or more cameras mounted on the moving body to one or more image processing apparatuses configured to perform image processing on the videos when the moving body is determined to be in the predetermined operation status.

[Supplementary Note 19]

A non-transitory computer readable medium storing a program for causing a processor to execute processing of:
determining that a moving body is in a predetermined operation status; and
transmitting videos of one or more cameras mounted on the moving body to one or more image processing apparatuses configured to perform image processing on the videos when the moving body is determined to be in the predetermined operation status.

REFERENCE SIGNS LIST

10: IMAGE PROCESSING SYSTEM
20: COMMUNICATION APPARATUS
21: OPERATION STATUS DETERMINATION MEANS
22: VIDEO TRANSMISSION MEANS
30: IMAGE PROCESSING APPARATUS
40: CAMERA
100: IMAGE ANALYSIS SYSTEM
110: IMAGE ANALYSIS APPARATUS
111: BUFFER
112: PROCESSING EXECUTION UNIT
120: REMOTE MONITORING APPARATUS
121: VIDEO RECEPTION UNIT
122: MONITOR SCREEN DISPLAY UNIT
130: NETWORK
140: ALLOCATION APPARATUS
200: COMMUNICATION APPARATUS
201: OPERATION STATUS DETERMINATION UNIT
202: VEHICLE OCCUPANCY RATE ACQUISITION UNIT
203: VIDEO TRANSMISSION UNIT
301: CAMERA

What is claimed is:

1. An image processing apparatus comprising:
a memory storing instructions; and
a processor configured to execute the instructions to:
determine whether an operating status of a vehicle is any of a first operating status and a second operating status;
when it is determined the operating status is the first operating status,
get images from one or more cameras which show inside the vehicle,
perform image analysis for the images by at least detecting whether a posture of an occupant in the vehicle meets a first condition, and
when it is detected that the posture meets the first condition, output a result of the image analysis to the occupant in the vehicle; and
when it is determined that the operating status transits from the first operating status to the second operating status, determine not to output the result.

2. The image processing apparatus according to claim 1, wherein
the processor is further configured to execute the instructions to:
acquire a vehicle occupancy rate of the vehicle; and
transmit the images from the one or more cameras when it is determined that the vehicle is in a predetermined operation status and the vehicle occupancy rate is greater than or equal to a first threshold.

3. The image processing apparatus according to claim 2, wherein
the one or more cameras are mounted on the vehicle, and
the processor is further configured to execute the instructions to determine, among other images captured by the one or more cameras, the images from the one or more cameras as to be transmitted according to the vehicle occupancy rate.

4. The image processing apparatus according to claim 3, wherein
the one or more cameras include a first camera for capturing a vehicle interior of the vehicle and a second camera for capturing the vehicle interior of the vehicle and within a range smaller than that of the first camera, and
the processor is further configured to execute the instructions to:
determine the images from the one or more cameras to be transmitted when the vehicle occupancy rate is greater than or equal to a second threshold, the second threshold being greater than the first threshold; and
determine that just a subset of the images, the subset being less than all of the images from the one or more cameras and being from the first camera, as to be transmitted when the vehicle occupancy rate is greater than or equal to the first threshold and lower than the second threshold.

5. The image processing apparatus according to claim 1, wherein
the processor is further configured to execute the instructions to sequentially analyze the images in a time-division manner.

6. The image processing apparatus according to claim 1, further comprising:
a communication apparatus mounted on the vehicle.

7. The image processing apparatus according to claim 6, wherein transmitting the images comprises transmitting the images to an allocation apparatus comprising a second memory storing second instructions and a second processor configured to execute the second instructions to allocate the images to any of one or more image processing apparatuses.

8. The image processing apparatus according to claim 7, wherein
the one or more image processing apparatuses include a first image processing apparatus and a second image processing apparatus, and the first image processing apparatus is capable of performing image processing on a predetermined number of images per unit time, and
the second processor of the allocation apparatus is further configured to execute the second instructions to:
receive the images from the communication apparatus,
determine whether number of the images to be processed by the first image processing apparatus per unit time exceeds the predetermined number when the received images from the one or more cameras are processed by the first image processing apparatus, and
allocate the received images from the one or more cameras to the first image processing apparatus when it is determined that the number of images to be processed does not exceed the predetermined number.

9. The image processing apparatus according to claim 8, wherein
the second processor of the allocation apparatus is further configured to execute the instructions to allocate the images of the one or more cameras to the second image processing apparatus when it is determined that the images to be processed exceeds the predetermined number.

10. The image processing apparatus according to claim 1, wherein
the processor is further configured to execute the instructions to determine, as a specific operation status, a status in which a danger may occur to a passenger riding on the vehicle.

11. The image processing apparatus according to claim 1, wherein
the first condition is a status in which a danger may occur to the passenger and includes at least one of the following: the vehicle stops at a stop, the vehicle departs from a stop, and an acceleration of the vehicle in longitudinal and lateral directions is greater than or equal to a predetermined value.

12. The image processing apparatus according to claim 1, wherein the processor is configured to execute the instructions to, when it is determined the operating status is the first operating status, start to perform the image analysis.

13. An image processing method comprising:
determining whether an operating status of a vehicle is any of a first operating status and a second operating status;
when it is determined that the operating status is the first operating status,
getting images from one or more cameras which show inside of the vehicle,
performing image analysis for the images by at least detecting whether a posture of an occupant in the vehicle meets a first condition, and
when it is detected that the posture meets the first condition, outputting a result of the image analysis to the occupant in the vehicle, and
when it is determined that the operating status transits from the first operating status to the second operating status, determining not to output the result.

14. The image processing method according to claim 13, further comprising:
acquiring a vehicle occupancy rate of the vehicle; and
controlling transmission of the images from the one or more cameras when it is determined that the vehicle is in a predetermined operation status and the vehicle occupancy rate is greater than or equal to a first threshold.

15. The image processing method according to claim 14, wherein
the one or more cameras are mounted on the vehicle, and
the method further comprises determining, among other images captured by the one or more cameras, the images from the one or more cameras as to be transmitted according to the vehicle occupancy rate.

16. The image processing method according to claim 15, wherein
the one or more cameras include a first camera for capturing a vehicle interior of the vehicle and a second camera for capturing the vehicle interior of the vehicle and within a range smaller than that of the first camera, and
the method further comprises:
determining the images from the one or more cameras to be transmitted when the vehicle occupancy rate is greater than or equal to a second threshold, the second threshold being greater than the first threshold; and
determining that just a subset of the images, the subset being less than all of the images from the one or more cameras and being from the first camera, as to be transmitted when the vehicle occupancy rate is greater than or equal to the first threshold and lower than the second threshold.

17. The image processing method according to claim 13, further comprising:
when it is determined the operating status is the first operating status, starting to perform the image analysis.

18. An image processing system comprising:
a first apparatus comprising a memory storing instructions, and a processor configured to execute the instructions to perform image processing on videos; and
an image analysis apparatus comprising a memory storing instructions, and a processor configured to execute the instructions to perform image analysis comprising at least detecting whether a posture of an occupant in a vehicle meets a first condition, wherein
the processor of the first apparatus is further configured to:
determine whether an operating status of the vehicle is any of a first operating status and a second operating status;
when it is determined that the first operating status is applied,
send images from one or more cameras, which show inside of the vehicle, to the image analysis apparatus,
when the image analysis apparatus detects that the posture meets the first condition, receive a result of the image analysis, and
output the result of the image analysis to the occupant in the vehicle, and
when it is determined that the operating status transits from the first operating status to the second operating status, determine not to output the result.

19. The image processing system according to claim 18, the processor of the image analysis apparatus is configured to execute the instructions to, when it is determined the operating status is the first operating status, start to perform the image analysis.

* * * * *